United States Patent [19]
DiNanno et al.

[11] Patent Number: 5,489,019
[45] Date of Patent: Feb. 6, 1996

[54] FEED TRAY FOR SINGULARIZING OBJECTS

[75] Inventors: James M. DiNanno, Wakefield; Richard N. Heino, Westminster; John P. Maillet, Jr., Boylston, all of Mass.

[73] Assignee: Stokes-Merrill Corporation, Bristol, Pa.

[21] Appl. No.: 285,809

[22] Filed: Aug. 4, 1994

[51] Int. Cl.⁶ .................................................. B65G 27/00
[52] U.S. Cl. .................... 198/752.1; 198/446; 193/25 FT
[58] Field of Search .......................... 193/2 R, 4, 25 A, 193/25 FT, 27, 2 D; 198/446, 452, 752, 443

[56] References Cited

U.S. PATENT DOCUMENTS

| | | |
|---|---|---|
| 1,033,446 | 7/1912 | Morton .................. 198/446 X |
| 1,755,721 | 4/1930 | Winkler et al. . |
| 2,586,586 | 2/1952 | Washburn et al. .................. 198/446 X |
| 2,632,588 | 3/1953 | Hoar, Jr. . |
| 3,240,314 | 3/1966 | Griner .................................. 198/446 X |
| 4,677,283 | 6/1987 | Lewis . |

FOREIGN PATENT DOCUMENTS

| | | | |
|---|---|---|---|
| 2457506 | 6/1975 | Germany .................................. 193/27 |
| 2802025 | 7/1979 | Germany .................................. 198/446 |

*Primary Examiner*—James R. Bidwell
*Attorney, Agent, or Firm*—Dickstein, Shapiro & Morin

[57] ABSTRACT

The invention relates to a feed tray for singularizing objects. The tray includes at least one guide path extending the length of the tray for transporting and singularizing objects. The path comprises a number of segments, at least some of which define a direction of movement oriented at an angle with respect to the drive axis of the tray.

8 Claims, 5 Drawing Sheets

FEED TRAY FOR SINGULARIZING OBJECTS

FIELD OF THE INVENTION

The present invention relates to a feed tray for singularizing objects and, more particularly, to a feed tray suitable for use with automatic, high speed counting and filling devices.

BACKGROUND OF THE INVENTION

Automatic, high-speed counting and filling devices are routinely used in a number of industries to count and package predetermined quantities of discrete objects. For example, pharmaceutical manufactures use such devices to package pills, tablets, capsules and similar discrete dosage forms. Automatic counting and filling machines are also used in the hardware industry to count and package nuts, bolts, screws and similar hardware, and by food manufactures to count and package discrete edible items, such as nuts and candies.

To meet the requirements of, for example, the pharmaceutical industry, such devices must be capable of rapidly filling a large number of containers, typically on the order of one hundred to several hundred containers per minute, with a quantity of product which corresponds to the predetermined quantity. In addition, the apparatus should be able to accurately distinguish chipped, broken or otherwise damage product from intact product and segregate containers containing damage product for additional processing. Finally, since automatic counting and filling devices are typically used to package several different products, the device should be designed such that it can be easily disassembled and thoroughly cleaned in order to minimize down time.

Several different types of automatic counting and packaging devices are currently available. In one such device, product is continuously dropped from a hopper onto a vibrating feed tray which advances the product downstream to a photosensor for counting. When a quantity of product equaling the predetermined quantity has been counted by the photosensor, the product is directed into a container. Such devices present a number of disadvantages. First, a considerable distance must be provided between the hopper and the photosensor to ensure that the feed tray has sufficiently singularized the product to be accurately counted by the photosensor. In some cases up to three vibrating feed trays must be employed for this purpose. Second, the design of known feed trays is such that the tray must be vibrated at a relatively low frequency and amplitude to ensure that the product does not move downstream with excessive hop, i.e., the product is not elevated too high off the surface of the tray. Accordingly, the product cannot be advanced along the feed tray at optimum speeds, which results in generally unacceptable filling rates.

It is, therefore, an object of the invention to provide a feed tray that will completely singularized a quantity of objects over a linear distance which is significantly reduced from that required by prior art feed trays.

It is a further object of the invention to provide a feed tray which permits a feed rate significantly higher than the rates permitted by prior art feed trays.

SUMMARY OF THE INVENTION

The present invention meets these and other objects by providing a feed tray which defines an axis extending between an inlet portion and a discharge portion of the tray. The tray includes at least one guide path extending from the inlet to the out discharge portion of the tray for transporting and singularizing objects. Objects deposited on the inlet portion of the tray are advanced along the guide path and are singularized or separated from one another for counting by the time they arrive at the discharge portion of the tray. The guide path includes a plurality of segments, and each of the segments defines a direction of movement along the axis. At least some of the segments are oriented at an angle with respect to the axis, and the angle at which respective segments are oriented becomes decreasingly oblique toward the discharge portion of the tray.

Since the guide path includes at least some segments which define a direction of movement oriented at an angle with respect to the axis, and since the angle becomes decreasingly oblique toward the discharge portion of the feed tray, objects advance along the guide path at differing velocities depending on their particular location on the path. For example, objects located on a segment of the path near the inlet portion of the tray and oriented at a highly oblique angle to the axis move at a much slower velocity than objects located on a segment of the path near the discharge portion of the tray and oriented parallel or nearly parallel to the axis. This is the case because objects having a direction of movement oriented at an angle with respect to the feed tray's axis have a velocity component directed transversely to the axis. The more oblique the angle the greater this component is.

Due to the differing velocities at which objects advance along the guide path, the tray is able rapidly singularize or separate the objects from one another as they advance from the inlet portion to the discharge portion of the feed tray. Accordingly, the feed tray of the present invention is much shorter than those found in the prior art, wherein the guide paths extend parallel to the axis throughout their entire length. Moreover, the feed tray taught by the invention is capable of singularizing objects while operating at a much higher feed rates as compared with prior art devices.

DETAILED DESCRIPTION OF THE INVENTION

Figure 1:
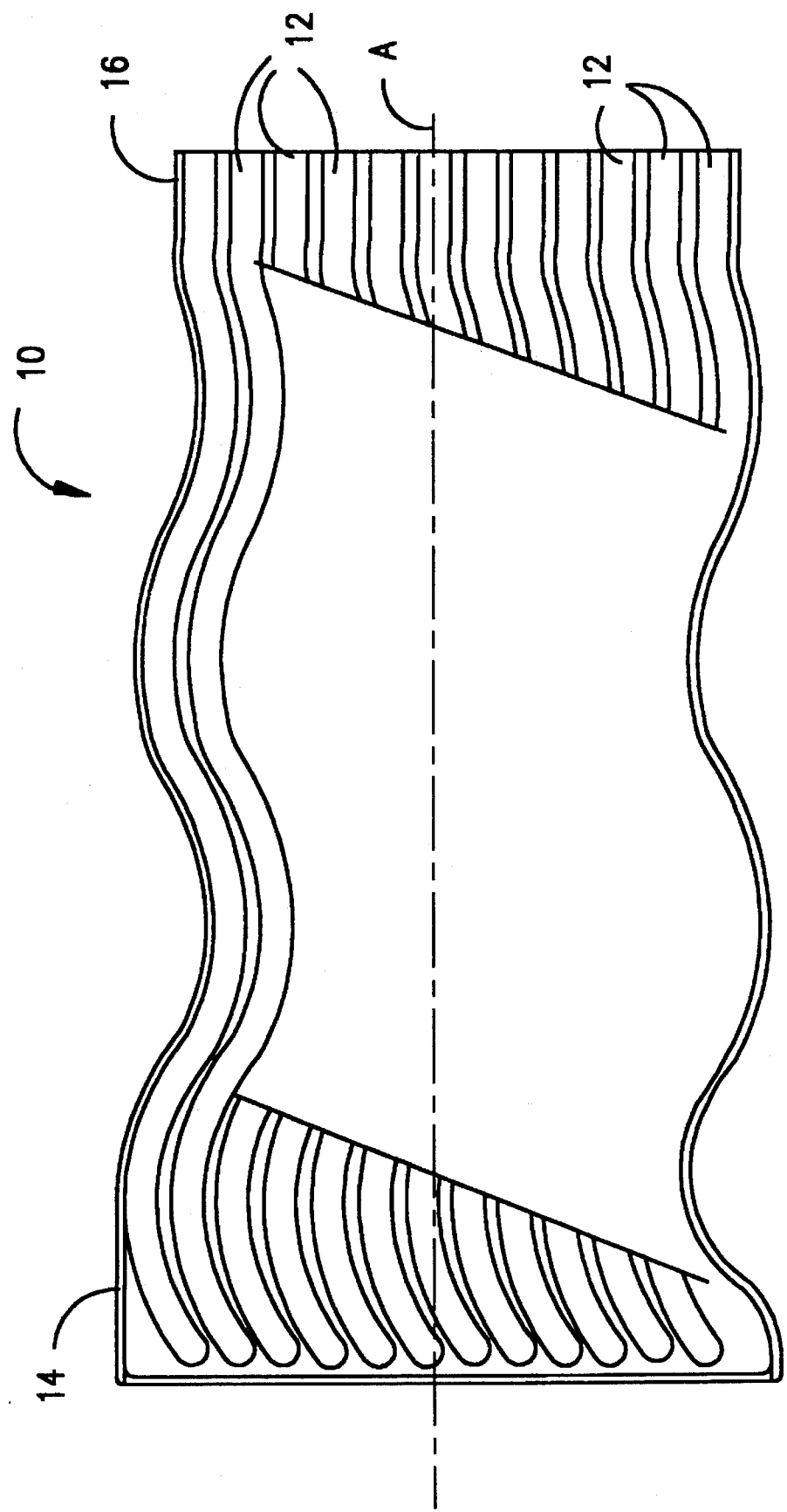
FIG. 1 is a top plan view of a feed tray embodying the invention.

FIG. 1 illustrates a feed tray embodying the present invention. The feed tray, generally designated 10, defines a plurality of lanes or guide paths 12 for transporting objects from an inlet portion 14 to a discharge portion 16 of the tray. Each guide path 12 defines an undulating or wave-like pattern, wherein the wave become decreasingly less arcuate toward the discharge portion of the tray. More specifically, each guide path comprises a plurality of segments, and each segment defines a direction of movement with respect to the drive or feed axis A of the tray. As FIG. 1 shows, the direction of movement defined by at least some of the segments is oriented at an angle with respect to the axis A, and the angles become decreasingly oblique toward the discharge portion 16 of the tray. Those segments of each path located at the discharge portion of the tray are oriented parallel to the axis A and, accordingly, define a direction of movement which is also parallel to the axis.

Figure 2:
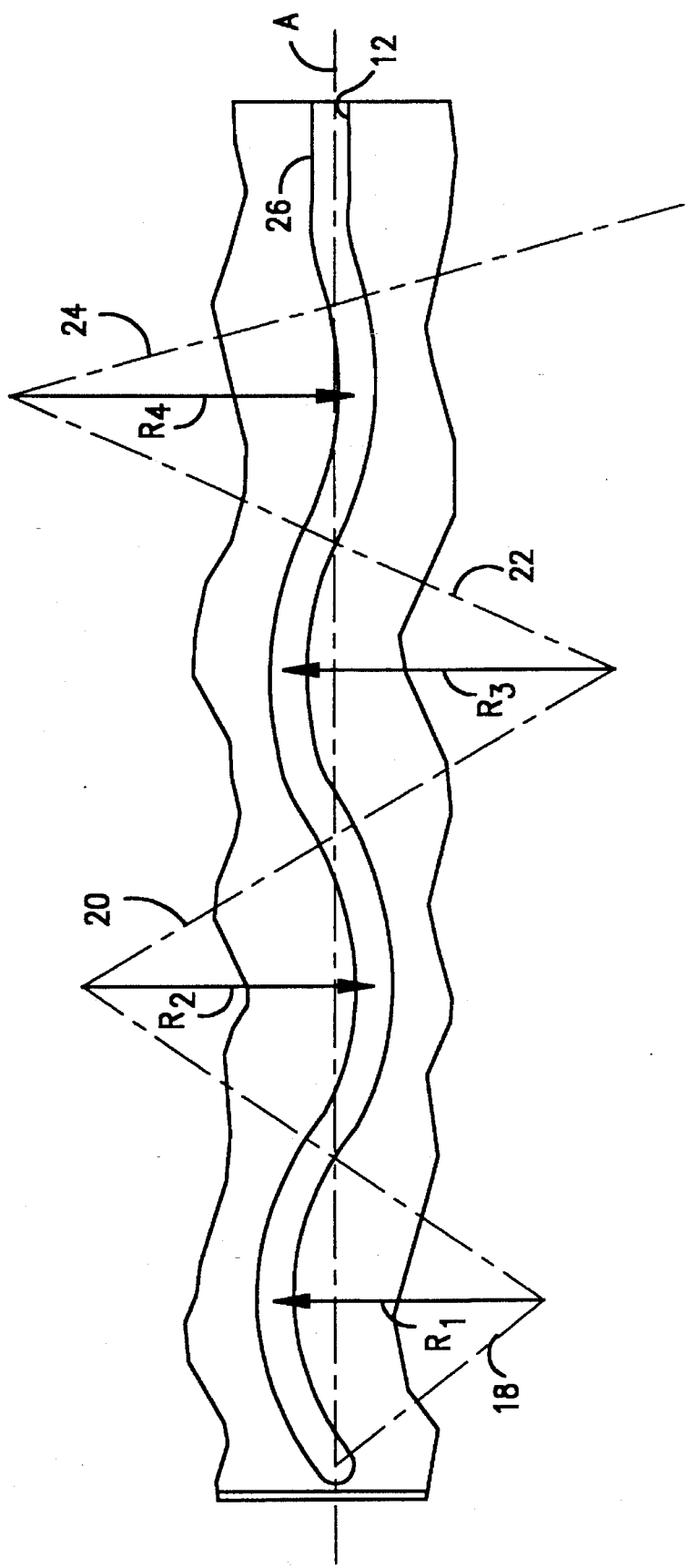
FIG. 2 is a top plan view of a guide path of the feed tray shown in FIG. 1.

Thus, as shown in greater detail in FIG. 2, each one of the guide paths 12 includes a plurality of arcuate segments, such as segments 18, 20, 22, 24, each defining a respective direction of movement oriented at an angle to the axis A, and at least one segment, such as segment 26, which defines a direction of movement parallel to the drive axis A. As also shown in FIG. 2, each of the arcuate segments 18, 20, 22, 24 has a radius, $R_1$–$R_4$ respectively, and the further a segment is positioned toward the discharge portion of the tray the longer its radius is. Thus, in a preferred embodiment of the invention, $R_1$–$R_4$ have lengths of 5.00 inches, 5.50 inches, 6.00 inches and 6.50 inches, respectively. It is also preferred, although the invention is in no way limited in this regard, that none of the segments define a direction of movement oriented at an angle of more than about 40° with respect to the axis A. Although angles in excess of 40° have been found acceptable, angles of about 40° or less allow rapid advancement of objects along the paths 12 without stacking or bunching of product.

The configuration illustrated in FIGS. 1 and 2 effectively causes objects to advance along each guide path at differing velocities depending upon each object's particular location on the path. As explained above, objects positioned on a segment defining a direction of movement oriented at an oblique angle to the drive axis A, such as segment 18, will advance more slowly along the guide path 12 than an object positioned on a segment defining a direction of movement parallel to the axis, such as segment 26. This is the case because an object having a direction of movement oblique to the drive axis will have a velocity component oriented transverse to the axis. It is also the case that objects will advance faster along a segment defining a direction of movement oriented at an angle to the axis which is less oblique as compared with some other segment defining a direction of movement oriented more obliquely to the axis. Thus, objects advancing along the guide paths 12 of the tray 10 will have greater velocity with respect to the drive axis A the closer they are to the discharge portion 16 of the tray.

Accordingly, the feed tray 10 facilitates a rapid singularization of the objects as they advance from the inlet portion to the discharge portion of the tray. This configuration also permits more rapid advancement of objects along the guide path, i.e., higher object feed rates, as compared with prior art feed trays. In this connection, it should be appreciated that the tray can be vibrated at frequencies of, for example, from about 80 Hz to about 100 Hz and preferably about 82 Hz, to advance objects along the guide path. This is in sharp contrast to prior art trays which are typically vibrated at no more than about 60 Hz. Moreover, the vibrational amplitude is much higher for a tray embodying the present invention than is permissible for prior art feed trays. For example, the tray 10 achieves feed velocities of up to 60 ft./min, whereas prior art devices operate at a feed velocity of no more than about 25 ft./min. Thus, whereas prior art devices typically utilize up to three feed trays to singularize objects for counting, the present invention employs a single tray having a length of from only about 20 inches to about 30 inches and preferably about 26 inches.

Figure 3:
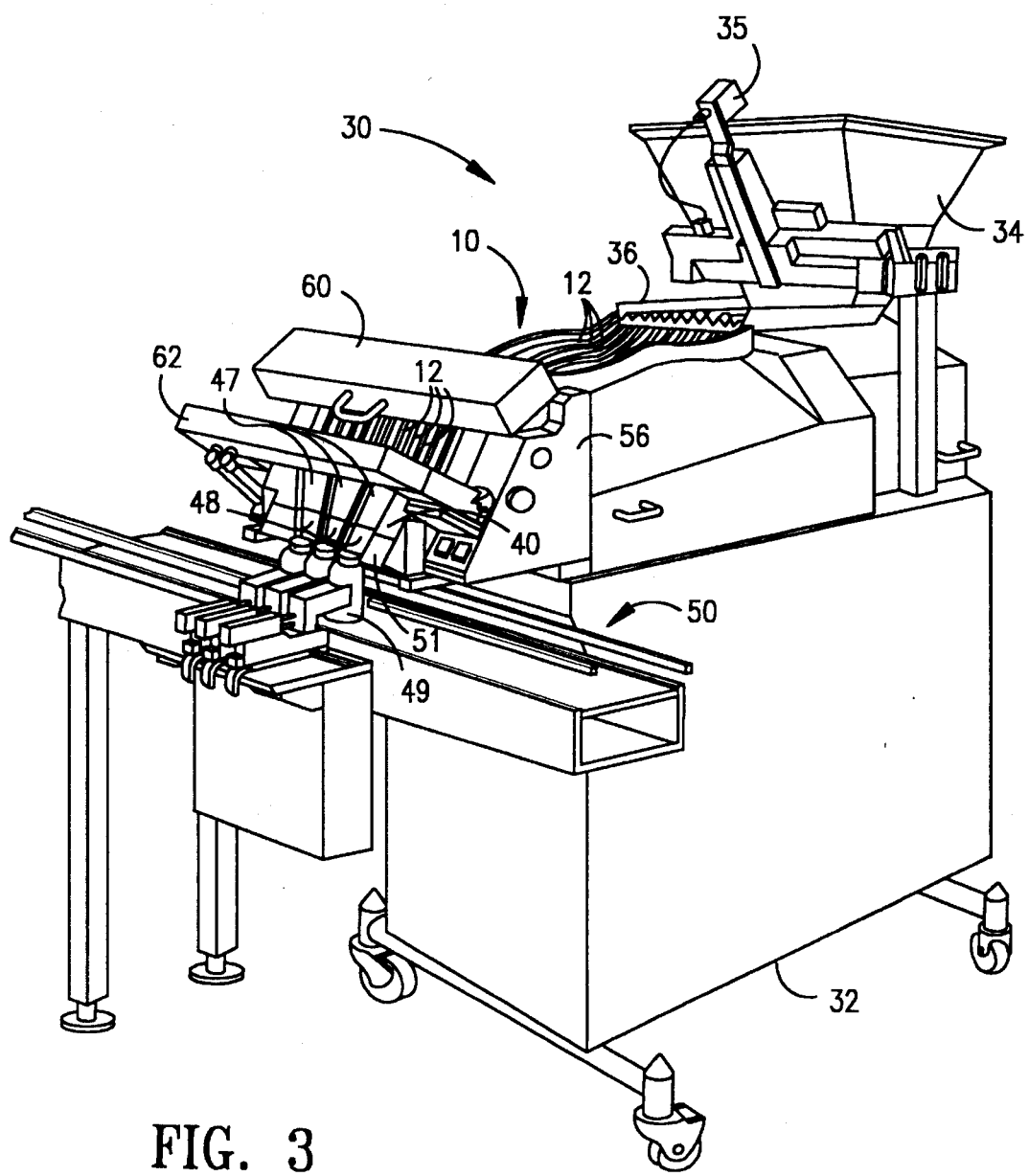
FIG. 3 is a perspective view of an automatic, high-speed counting and packaging apparatus incorporating the feed tray shown in FIG. 1.

Referring now to FIG. 3, an automatic, high-speed counting and packaging apparatus, generally designated 30, employing the feed tray 10 is shown. The apparatus is fully disclosed in commonly assigned U.S. patent application Ser. No. 08/285,806, filed on even date herewith and incorporated herein by reference as part of the present disclosure.

The apparatus 30 comprises a transportable housing and frame assembly 32 carrying a hopper 34 and associated product level sensor 35 for holding discrete objects to be counted and packaged (not shown), a pre-feed tray 36 mounted below the hopper, and the main feed tray 10 mounted downstream of the pre-feed tray to receive and singularize the objects discharged from the hopper and pre-feed tray.

Figure 4:
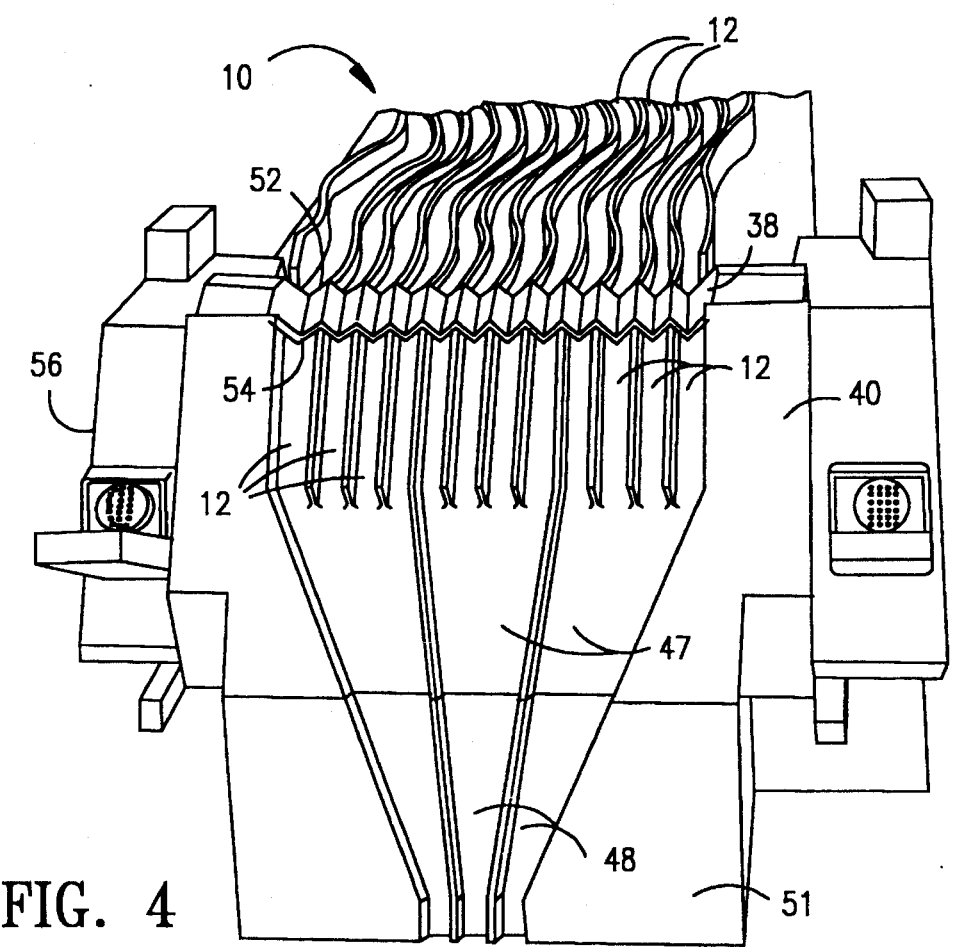
FIG. 4 is a front perspective of the apparatus shown in FIG. 3.

As shown in FIG. 4, a transition guide 38 is mounted downstream of the main feed tray 10, and a collection block 40 is mounted downstream of the transition guide to receive the singularized objects from the main feed tray and guide them toward respective containers, as is described further below.

Figure 5:
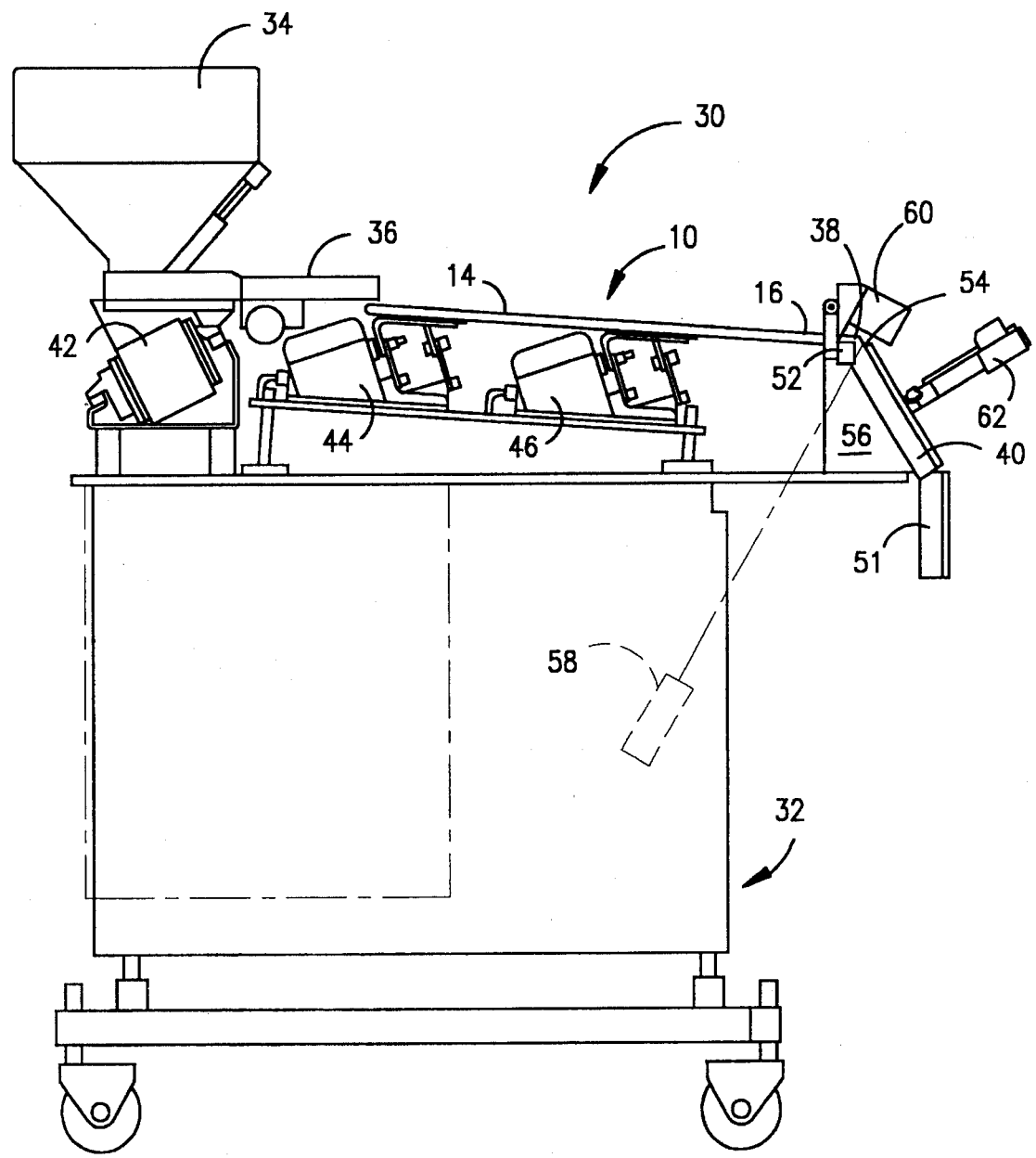
FIG. 5 is a side elevational view in partial section of the apparatus shown in FIG. 3.

Referring now to FIG. 5, a vibrator 42 is coupled to the pre-feed tray 36 to vibrate the tray and in turn drive the objects from one end of the tray to the other. Similarly, a first vibrator 44 is coupled to the inlet portion 14 of the main feed tray 10, and a second vibrator 46 is coupled near the discharge portion 16 to vibrate the tray, and in turn transport and singularize the objects as they advance from one end of the tray to the other. As also shown in FIG. 5, the main feed tray also slopes downwardly with respect to the horizontal from its inlet toward its outlet end to facilitate the movement and separation of the objects. Typically, the main feed tray is sloped at an angle of from about 3° to about 8° and preferably at an angle of about 7°.

Referring again to FIG. 4, it will be seen that the collection block 40 also defines a plurality of lanes or guide paths 12, each being aligned with a corresponding guide path of the transition guide 38 to receive the respective objects discharged through the lane. The collection block 40 also defines a lane-merging area located downstream of the guide paths 12 formed by three funnel-shaped lanes 47, each funnel being aligned with a group of guide paths to receive the singularized objects from the respective group. Each funnel 47 in turn directs the singularized objects into a respective chute 48 and then into a container 49 positioned beneath each chute by the conveyor 50 (shown in FIG. 3). The chutes 48 are formed in an interchangable part 51; thus, chutes adapted for particular bottle sizes and shapes are provided simply by changing the part 51.

With reference again to FIGS. 4 and 5, a vacuum slot 52 is defined between the outlet portion of the main feed tray 10 and the inlet end of the transition guide 38, and a sensor slot 54 is defined between the outlet end of the transition guide and the inlet end of the collection block 40. A vacuum manifold 56 is located immediately beneath the vacuum slot 52 to create a suction, and in turn draw any dust or loose particles passing over the slot into the manifold and away from the containers being filled.

An optical sensor 58 is mounted within the housing and frame assembly 32 and aligned with the sensor slot 54, as illustrated in dashed lines in FIG. 5, to scan the singularized objects as they pass over the slot from the transition guide to the collection block. In the preferred embodiment of the invention, the optical sensor 58 is a linear array picture processing camera, such as the "LAPP 1100" camera from Integrated Vision Products AB of Linkoping, Sweden. This particular camera has a linear array (i.e., a single row) of 128 pixels, each pixel having dimensions of 35 ×35 µm, and has image sensing, digitization and picture-processing capabilities. A background light 60 is mounted on the opposite side of the sensor slot 54 relative to the camera 58 and is tuned to the optimum bandwidth of the camera in order to minimize the effect of any variations in ambient light intensity, object reflectivity or other potential interferences. As each object passes over the sensor slot 54 it is repetitively scanned by the camera 58, and the image information is stored to not only count the respective object, but to assess its length and area.

As shown best in FIG. 3, a gating manifold 62 is mounted on the housing and frame assembly 32 adjacent to the collection block 40 and comprises a plurality of gates (not shown) for controlling the discharge of singularized objects into the containers 49. Each gate is aligned with a respective guide path 12 on the collection block 40 and is actuated, such as, for example by a pneumatic piston and cylinder assembly, between an extended position to block the passage of objects through the respective guide path 12, and a retracted position to permit the passage of objects through the respective guide path and into a bottle positioned beneath the chute 48.

The control system for operating the apparatus 30 to automatically fill containers with a predetermined quantity of objects is fully disclosed in commonly assigned U.S. patent application Ser. No. 08/285,898, filed on even date herewith and incorporated herein by reference as part of the present disclosure.

Returning briefly to a discussion of the tray 10, the design of the tray permits higher vibrational frequencies and higher amplitudes than are feasible with prior art feed trays. For example, the main feed tray vibrators 44 and 46 are operated from about 80 Hz to about 100 Hz and preferably about 82 Hz, whereas prior art devices have typically operate at only about 60 Hz. The high vibrational frequency, high amplitude and unique configuration of the feed tray of the present invention permit singularization of objects at much faster rates. Thus, whereas prior art devices typically utilize up to three feed trays to singularize objects for counting, the present invention employs a single tray having a length of from about 20 inches to about 30 inches and preferably about 26 inches. Moreover, whereas prior art feed trays are limited to object speeds along the guide paths of only about 25 ft./min., a feed tray embodying the present invention efficiently singularizes objects at speeds of up to 60 ft./min.

Figure 6:
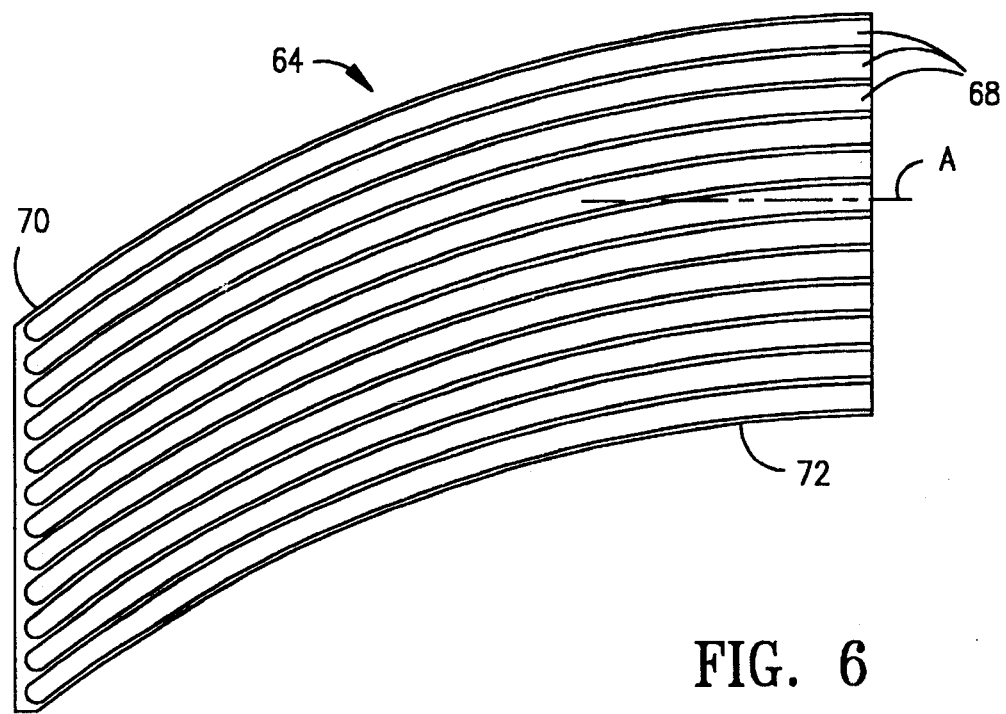
FIG. 6 is a top plan view of a second feed tray embodying the invention.

It should be appreciated that the present invention is in no way limited to the tray illustrated in FIG. 1, since the invention encompasses any tray defining a guide path which at least in part defines a direction of movement oriented at an angle with respect to the drive axis A of the tray. Accordingly, FIG. 6 shows a feed tray 64 defining a plurality of guide paths 68 extending between the inlet portion 70 and the discharge portion 72 of the tray. Each path includes a plurality of segments which together define an arc of continuously changing radius. More particularly, the radius of the arcuate segments increases toward the discharge portion of the tray, and, accordingly, the angle at which the direction of movement defined by each segment is oriented with respect to the drive axis A of the tray constantly changes throughout the length of the path. Accordingly, the velocity of any given object advancing along a respective path changes constantly as the object moves from the inlet to the outlet portion of the tray. As in the case of the previously described tray, such a design enables the tray 64 to rapidly singularize objects moving along the guide paths 68.

While preferred embodiments have been shown and described, various modifications and substitutions may be made without departing from the spirit and scope of the invention. For example, the guide paths of the tray can include a plurality of linear segments, at least some of which define a direction of movement along the path oriented at an angle with respect to the drive axis of the tray. Accordingly, it is to be understood that the present invention has been described by way of example and not by limitation.

We claim:

1. A feed tray defining an axis extending between an inlet portion and a discharge portion of the tray, the tray sloping downwardly from said inlet portion to said discharge portion, the tray comprising:

vibration means for vibrating the tray;

at least one guide path extending along the axis for the passage and singularization of articles; and said at least one guide path including a plurality of segments, each said segment defining a direction of movement along the axis, wherein said direction defined by more than one of said segments is oriented at an angle with respect to the axis, said angle becoming less oblique toward said discharge portion of the tray.

2. The feed tray of claim 1 wherein the at least one guide path comprises a plurality of reversely arcuate segments, said arcuate segments increasing in radius from the inlet portion to the discharge portion of the tray.

3. The feed tray of claim 1 wherein the at least one guide path defines an arc extending from the inlet portion to the discharge portion of the tray, said arc comprising a plurality of arcuate segments, said segments increasing in radius from the inlet portion to the discharge portion of the tray.

4. The tray of claim 1 wherein the at least one guide path comprises a plurality of linear segments and wherein at least some of said segments defines a direction of movement oriented at an angle with respect to said axis.

5. A feed tray as recited in claim 1, wherein the tray slopes downwardly at a slope in the range of about 3° to about 8°.

6. A feed tray as recited in claim 5, wherein the tray slopes downwardly at a slope of about 7°.

7. A feed tray as recited in claim 1, wherein said vibration means includes a first vibrator coupled to said inlet portion and a second vibrator coupled to said discharge portion.

8. A feed tray as recited in claim 1, wherein said angles of said segments from the axis is in the range of about 0° to about 40°.

* * * * *